United States Patent [19]

Rütschle

[11] Patent Number: 5,002,442

[45] Date of Patent: Mar. 26, 1991

[54] MACHINE TOOL

[75] Inventor: Eugen Rütschle, Müheim, Fed. Rep. of Germany

[73] Assignee: Chiron-Werke GmbH & Co. KG, Tuttlingen, Fed. Rep. of Germany

[21] Appl. No.: 579,157

[22] Filed: Sep. 6, 1990

[30] Foreign Application Priority Data

Sep. 9, 1989 [DE] Fed. Rep. of Germany ....... 3930070

[51] Int. Cl.⁵ ............................ B23C 1/00; B23B 49/00
[52] U.S. Cl. ...................................... 409/134; 408/238; 409/232
[58] Field of Search ............... 29/26 R, 26 A, 57, 53, 29/55, 40; 409/134, 137, 232, 234; 279/9 R; 408/67, 239 R, 238, 241 R, 56, 16; 340/680

[56] References Cited

U.S. PATENT DOCUMENTS

| | | | |
|---|---|---|---|
| 3,593,614 | 7/1971 | Galbarini | 409/232 |
| 4,504,824 | 3/1985 | Mello | 340/680 |
| 4,525,918 | 7/1985 | Puritz | 29/568 |
| 4,664,571 | 5/1987 | Takada et al. | 409/134 |
| 4,745,674 | 5/1988 | Abe et al. | 409/232 X |

FOREIGN PATENT DOCUMENTS 3320873  6/1983  Fed. Rep. of Germany .

OTHER PUBLICATIONS

Leaflet "Werner Transfer-Center TC", p. 6, dated May 1982.

*Primary Examiner*—William Briggs
*Attorney, Agent, or Firm*—Pretty, Schroeder, Brueggemann & Clark

[57] ABSTRACT

Figure 1:
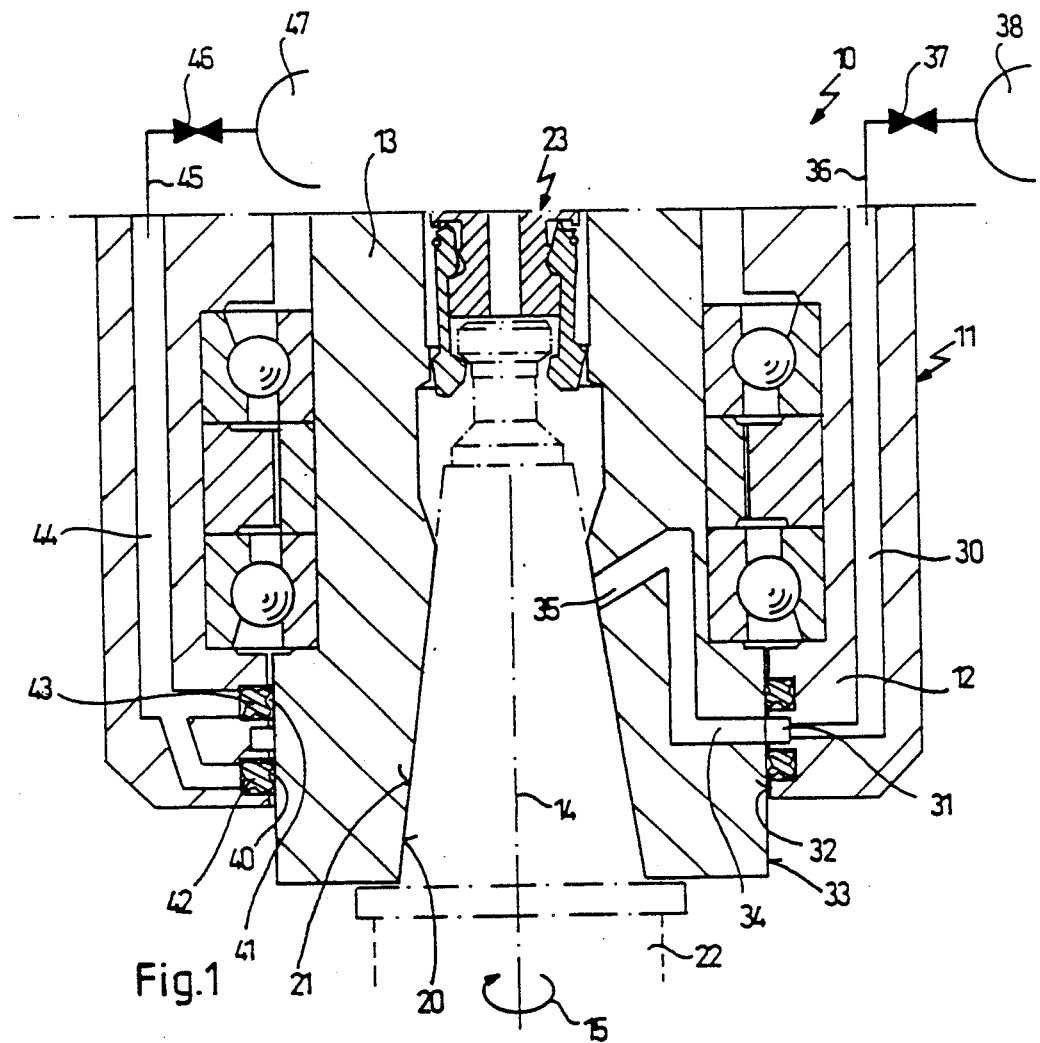

A machine tool comprises a spindle stock (11) in which a spindle (13) is seated for rotation about a spindle axis (14). The spindle (13) is provided with a receptacle (20) for the taper (21) of a toolholder (22). A first annular groove (31) is arranged in a stationary ring bearing (12) of the spindle stock (11), adjacent a first end of at least one duct (34) provided in the rotatable spindle (13), the other end of which terminates in a blow-off outlet (35) opening into the receptacle (20). The first annular groove (31) can be connected to a compressed-air source (38). In the stationary condition of the spindle (13), an elastic annular seal (42, 43) can be applied in sealing relationship between the stationary bearing ring (12) and the spindle (13), on both sides axially of the first annular groove (31), by the action of compressed air. A second and a third annular groove (40, 41) are arranged in the ring bearing (12), on either side of the said first annular groove (31) in the axial direction. An annular seal (42, 43) is accommodated in each of the second and the third annular grooves (40, 41). The annular seals (42, 43) accommodated in the second and third annular grooves (40, 41) can be subjected to the action of compressed air (49) applied in radial direction, from the side opposite the said spindle (13) (FIG. 1).

3 Claims, 1 Drawing Sheet

MACHINE TOOL

The present invention relates to a machine tool having a spindle stock in which a spindle provided with a receptacle for the taper of a toolholder is seated for rotation about a spindle axis, and comprising further a first annular groove arranged in a stationary ring bearing of the spindle stock, adjacent a first end of at least one duct provided in the rotatable spindle, the other end of which terminates in a blow-off outlet opening into the receptacle, the arrangement being such that the first annular groove can be connected to a compressed-air source and that, in the stationary condition of the spindle, an elastic annular seal can be applied in sealing relationship between the stationary bearing ring and the spindle, on both sides axially of the first annular groove, by the action of compressed air.

A machine tool of the before-mentioned kind has been known from DE-OS No. 33 20 873.

Machine tools of the kind of interest in the present case, namely so-called machining centers, have the common feature that toolholders with different tools are mounted in succession in the receptacle of the spindle. This is effected with the aid of tool-changing devices which pick up one toolholder from the tool magazine and mount another one in the receptacle of the spindle, or vice versa.

During the tool-changing process, the interior conical surface of the spindle stock receptacle is exposed due to the fact that the taper of the toolholder has been removed from the receptacle and has been transported to the tool magazine by a swinging movement. Thus, it may well happen during this phase that metal chips mixed with drilling coolant splashing around may get into the receptacle of the spindle. When the next taper of a toolholder is then introduced into the receptacle, the metal chip will be crushed between the conical surfaces of the toolholder and the receptacle, respectively, and both conical surfaces may be damaged. This is true in particular because the toolholders are drawn into the receptacle of the spindle under relatively high axial clamping forces, the frictional engagement between the taper and the interior conical counter-surface of the receptacle of the spindle being also utilized for torque transmission.

It has, therefore, been known to blow the spindles through during tool changes. While previously this was done manually in such a way that when the tool taper had been removed, the user would blow the receptacle through using a compressed-air gun, modern machine tools make use for this purpose of a blow-off feature which is integrated in the spindle.

In the case of a known machine tool, as illustrated for example on page 6 of the German leaflet entitled "WERNER Transfer-Center TC" dated May 1982, an oblique radial duct leads from the cylindrical outer surface upwardly to an upper area of the spindle which, when the toolholder is mounted in position, provides a free space above the tool taper, the radial bore being located opposite a stationary compressed-air connection provided in a ring bearing of the spindle stock.

However, this known arrangement is connected with the drawback that the stationary duct in the ring bearing is in proper alignment with the radial channel in the spindle only in a single rotary position of the spindle so that the latter has to be stopped in a defined rotary position to enable the receptacle of the spindle to be blown through, the connection between the ducts arranged in the stationary ring bearing and the rotating spindle being established only in this single rotary position.

However, it is not always guaranteed in certain machine tools that the rotating spindle will always stop in the same rotary position. This may be true, for example, for machine tools where the tool magazine surrounds the spindle stock in ring-shaped arrangement. In this case, each toolholder located in a predetermined peripheral position in the tool magazine has assigned to it a defined gripper arm mounted for swinging in a radial plane, in order to transfer the particular tool from its peripheral magazine position to the central spindle position.

Due to these constructional conditions, the spindle of this known machine tool stops in a defined rotary position in which the "old" toolholder can be exchanged in a given radial plane by the gripper arm assigned to it. The spindle is then rotated over a predetermined rotary angle until that radial plane is reached in which the "new" toolholder can be mounted by the gripper arm assigned to it. Consequently, the spindle assumes a stationary condition in two defined rotary positions.

The before-mentioned DE-OS No. 33 20 873 now describes a blow-off arrangement which permits the mounting device of the spindle to be operated in any rotary position of the spindle. To this end, the rotary spindle is provided with a ring comprising an outer annular groove. Two annular elastic seals of circular cross-section project from an opposite bearing ring of the spindle stock in radial planes extending parallel to each other, the arrangement being such that the seals are positioned immediately adjacent the radial end faces of the outer annular groove of the spindle, but do not contact the latter.

A compressed-air line extends through the stationary ring bearing of the spindle stock into the area between the two circular annular seals. Now, when compressed air is supplied through the compressed-air line, with the spindle in stationary condition, the air pressure acts to urge the two circular annular seals away from each other and to the outside, so that the seals come to bear against the radial end faces of the outer annular groove of the spindle, thus sealing the transition between the stationary ring bearing and the rotary spindle over the whole periphery of the outer annular groove.

Once the blow-off process has been completed and the compressed-air supply has been switched off, the elasticity of the circular annular seals causes the latter to return to their initial position in which they are no longer in contact with the spindle.

However, it has been found in practice that the known machine tool is connected with certain disadvantages as the circular annular seals do not achieve a sufficient sealing effect. This is due, among other things, to the fact that on the one hand it is necessary to adjust a sufficient axial clearance between the seals and the radial end faces of the outer annular groove, while on the other hand the annular gaps so formed allow the incoming compressed air to escape without building up a pressure sufficient to bend the elastic seals outwardly in axial direction.

Now, it is the object of the present invention to improve a machine tool of the before-mentioned type in such a way that a sufficient sealing effect is achieved between the stationary ring bearing and the rotary spindle to enable large quantities of compressed air to be supplied for blowing through the receptacle.

The invention achieves this object by an arrangement in which a second and a third annular groove are arranged in the ring bearing, on either side of the first annular groove in the axial direction, an annular seal is accommodated in each of the second and the third annular grooves, and the annular seals accommodated in the second and third annular grooves can be subjected to the action of compressed air applied in radial direction, from the side opposite the spindle.

This solves the object underlying the present invention fully and perfectly. For, the pressure applied upon the two seals in the radial direction has the effect to compress the seals, both their diameter and their circumference being reduced by the pressure applied. In this compressed condition, the annular seals then apply themselves radially against the stationary spindle, so that the first annular groove is completely sealed off on both sides in the axial direction. As, contrary to the prior-art design described above, the seals are not located in the flow path of the blow-off air, the air present on the side of the seals opposite the spindle can build up a pressure sufficient to compress the seals in the described manner. For the same reason, it is possible for the sealing effect to build up in a radial direction, rather than in the axial direction, as in the case of the described state of the prior art.

According to a preferred embodiment of the invention, the radial cross-section of the annular seals exhibits an X-shaped form, the free ends of the "X" being rounded and in contact with radial end faces of the second and third annular grooves, respectively.

These features provide the advantage that a multiple sealing effect is achieved because the compressed X-shaped sealing ring applies itself radially against the spindle and axially against the radial end faces of the second and third annular grooves, respectively.

Finally, another embodiment of the invention is particularly preferred where compressed air can be supplied separately, via different ducts, to the first annular groove on the one hand and the second and third annular grooves on the other hand.

This feature provides the advantage that it is now possible to subject the seals initially to a pressure in order to seal the first annular groove on both sides in the axial direction, before blow-off air is directed upon the first annular groove. This prevents blow-off air, which is introduced into the area of the first annular groove, from entering the area of the seals and from urging the latter radially outwardly, against the action of the actuating compressed air.

Other advantages of the invention will appear from the following description referring to the attached drawing.

It is understood that the features that have been described before and will be explained hereafter may be used not only in the described combinations, but also in any other combination, or individually, without leaving the scope and intent of the present invention.

Figure 2:
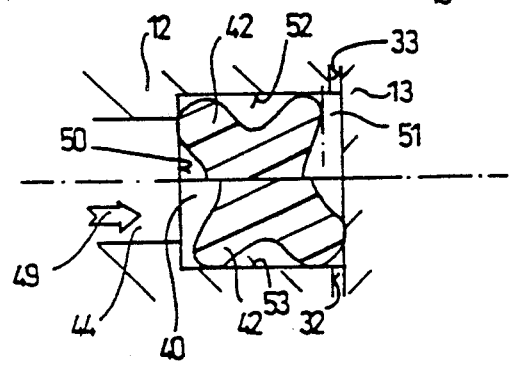

One embodiment of the invention will now be described in more detail with reference to the drawing in which:

FIG. 1 shows a sectional side view of part of a spindle of one embodiment of a machine tool according to the invention; and FIG. 2 shows a detail of FIG. 1, in greatly enlarged scale, illustrating the sealing effect of an annular seal of X-shaped radial cross-section.

In FIG. 1, a machine tool indicated generally by reference numeral 10 comprises a spindle stock 11 terminating at its bottom in a stationary ring bearing 12. The ring bearing 12 encloses a concentrically arranged spindle 13 which is mounted for rotation about a spindle axis 10, as indicated by arrow 15.

The bottom of the spindle 13 is provided with an interior conical receptacle 20 of a shape complementary to the taper 21 of a toolholder 22. The receptacle 20 is provided at its upper end with chucking means 23 intended for drawing the toolholders 32 into the receptacle 20—from the bottom to the top in FIG. 1—and for fixing it in that position.

The stationary ring bearing 12 is passed by a first compressed-air line 30 which initially extends in the axial direction and is then bent off inwardly in radial direction at the bottom of the ring bearing 12, where it terminates in a first annular groove 31 in an interior cylindrical surface 32 of the ring bearing 12.

The interior cylindrical surface 32 extends adjacent to an exterior cylindrical surface 33 of the spindle 13, at a small radial clearance. A duct 34 ends at the exterior cylindrical surface 33 in a position just opposite the first annular groove 31.

The duct 34 then runs in axially upward direction, terminating in the receptacle 20 by a blow-off opening 35.

The first compressed-air line 30 is connected, at the top of the spindle stock 11, to a further compressed-air line 36 which in its turn is connected to a compressed-air source 38 via a valve 37.

Additional annular grooves are provided in the interior cylindrical surface 32 on both sides, axially, of the first annular groove 31, namely a second annular groove 40 below and a third annular groove 41 above the first annular groove 31. Both the second annular groove 40 and the third annular groove 41 accommodate annular seals 42, 43 inserted therein, respectively.

A second compressed-air line 44 with a branched lower end is run, likewise in axial direction, through the stationary ring bearing 12 and connected to the second and third annular grooves 40, 41 at their side facing away from the spindle 13.

The second compressed-air line 44 is likewise connected to a compressed-air source 47, via an additional compressed-air line 45 and a valve 46.

As can be seen clearly in the enlarged representation of FIG. 2, the radial cross-section of the annular seals 42, 43 has the shape of an X, the free ends of the "X" being rounded.

The upper half of FIG. 2 shows the annular seal 42 in unloaded condition. It will be readily recognized that the free ends of the "X" are in contact with both the inner annular face 50 of the second annular groove 40 and the radial end face 52. The seal 42 and the annular groove 40 are sized in such a way that a clearance 41 remains between the seal 42 and the exterior cylindrical surface 33 of the spindle 13 in the unloaded condition of the seal 42. This is achieved in the radial direction by adapting the outer diameter of the seal 42 just to the diameter of the interior annular surface 50.

Now, when compressed air is introduced through the second compressed-air line 44, as indicated by arrow 49 in the lower half of FIG. 2, the seal 42 is displaced radially inwardly, in the direction towards the spindle 13. This causes the free ends of the "X" to slide inwardly along the radial end face 53 until the seal 42 comes to rest against the exterior cylindrical surface 33 of the spindle 13.

This leads to a reduction in the diameter and, thus, in the circumference of the seal 42 which is thereby compressed—a process which is rendered possible by the elastic material from which the seal 42 is made.

On the other hand, this means that once the compressed-air supply to the second compressed-air line 44 is interrupted, the seal 42 will automatically expand elastically and will thereby return to its initial position illustrated in the upper half of FIG. 2, without any action from the outside.

The valves 37 and 46 enable the blow-off process to be operated in a controlled manner.

To this end, one opens initially the valve 46, with the valve 37 in closed condition, so as to supply compressed air from the compressed-air source 47 to the rear face of the seals 42, 43. This causes the first annular groove 31 to be sealed on both sides in the axial direction, the clearance between the surfaces 32, 33 being closed.

One now opens the valve 37, with the valve 46 still in open condition, so as to cause blow-off air to be supplied from the compressed-air source 38 to the blow-off opening 35 via the first compressed-air line 30 and the duct 34.

One then closes at first the valve 37, then the valve 46, so that the seals 42, 43 are permitted to expand elastically and to clear again the clearance 51 between the seals 42 and the exterior cylindrical surface 33 of the spindle 13. In this condition, the spindle 13 is again permitted to rotate freely, without any braking couple being exerted.

I claim:

1. A machine tool having a spindle stock, said spindle stock comprising:
    a spindle being rotatable about an axis, said spindle having a conical receptacle for receiving tapered sections of toolholders therein, said spindle having a first, outer circumferential surface and having, further, a first duct, said duct opening with a first terminal thereof into said receptacle and with a second terminal thereof into said first, outer circumferential surface;
    a spindle stock annular bearing, being stationary with respect to said rotatable spindle and surrounding said spindle along said first, outer circumferential surface with a second, inner circumferential surface, said circumferential surfaces having an air gap between them, said bearing being provided with:
        a first annular groove provided in said second, inner circumferential surface, and being axially flush with said second terminal;
        a second and a third annular groove in said second, inner circumferential surface, said second and said third annular grooves being arranged on opposite axial sides of said first annular groove and being, further, provided with an elastic annular seal therein, which, under a first operational condition, do not extend beyond said second and said third annular grooves, respectively, in a radial direction, whereas, under a second operational condition, said annular seals circumferentially project radially inwardly beyond said second and said third annular grooves, respectively, thereby bridging said airgap and sealing off said first annular groove in an axial direction;
        a second duct interconnecting said first annular groove with first compressed air means;
        a third duct and a fourth duct, interconnecting, respectively, said second and said third annular grooves with second compressed air means, said third and said fourth ducts, respectively, opening into said second and said third annular grooves, respectively, at a radial position of said elastic annular seals opposite said first outer circumferential surface;
    control means arranged in said second, said third and said fourth duct, respectively, to apply compressed air, under said second operational condition, to said second, said third and said fourth duct, whereas said compressed air is removed from said second, said third and said fourth duct under said first operational condition.

2. The machine tool of claim 1, wherein said annular seals have a radial cross-section exhibiting an X-shaped form, free ends of said "X" being rounded and, further, being in contact with annular radial end phases of said second and said third annular grooves, respectively.

3. The machine tool of claim 1, wherein said third and said fourth duct are connected to each other within said annular bearing to be connected to said second compressed air means as one common duct.

* * * * *